(12) United States Patent
Lee et al.

(10) Patent No.: US 8,057,577 B2
(45) Date of Patent: Nov. 15, 2011

(54) DESULFURIZER FOR FUEL GAS FOR FUEL CELL AND DESULFURIZATION METHOD USING THE SAME

(75) Inventors: Doo-hwan Lee, Daejeon-si (KR); Soon-ho Kim, Seoul (KR); Hyun-chul Lee, Yongin-si (KR); Eun-duck Park, Incheon-si (KR); Eun-yong Ko, Jeiu-si (KR); Chan-ho Pak, Seoul (KR); Woo-sung Jeon, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 892 days.

(21) Appl. No.: 11/656,377

(22) Filed: Jan. 23, 2007

(65) Prior Publication Data

US 2007/0196258 A1    Aug. 23, 2007

(30) Foreign Application Priority Data

Feb. 18, 2006  (KR) .................. 10-2006-0015943

(51) Int. Cl.
*E04H 15/36* (2006.01)
*B01D 53/02* (2006.01)
*B01D 53/52* (2006.01)
*C01G 56/00* (2006.01)
*C22B 11/00* (2006.01)

(52) U.S. Cl. ............. 95/135; 96/141; 423/242.1; 423/6; 423/47

(58) Field of Classification Search ........................ None
See application file for complete search history.

(56) References Cited

U.S. PATENT DOCUMENTS

| 5,057,473 A | * | 10/1991 | Voecks et al. ................... 502/73 |
| 6,183,895 B1 | * | 2/2001 | Kudo et al. ..................... 429/20 |
| 6,579,347 B1 | * | 6/2003 | Wakita et al. .................. 95/135 |
| 6,764,535 B1 | * | 7/2004 | Lansbarkis et al. ............. 96/132 |
| 7,435,337 B2 | * | 10/2008 | Thomas et al. ............... 208/213 |

(Continued)

FOREIGN PATENT DOCUMENTS

CN        1482210 A       3/2004

(Continued)

OTHER PUBLICATIONS

Brezverkhyy, Igor et al. "Adsorption of tetrahydrothiophene on faujasite type zeolites: breakthrough curves and FTIR spectroscopy study" Applied Catalysis B: Envionrmental 62, 299-305 (2006).*

(Continued)

*Primary Examiner* — Melvin Mayes
*Assistant Examiner* — Sheng H Davis
(74) *Attorney, Agent, or Firm* — Christie, Parker & Hale, LLP

(57) ABSTRACT

A desulfurizer for fuel gas for a fuel cell includes: a first adsorption tank including an adsorber having selective adsorption capacity for a thiophene-based compound and a second adsorption tank including an adsorber having selective adsorption capacity for a mercaptan-based compound. The desulfurizer uses separate adsorbers having selective adsorption capacity for a thiophene-based compound and a mercaptan-based compound, in multiple stages to perform a more efficient and economical desulfurizing of a fuel gas to remove various sulfur compounds, especially thiophene-based compounds and mercaptan-based compounds compared to a desulfurizer using a single adsorber.

18 Claims, 12 Drawing Sheets

U.S. PATENT DOCUMENTS

| | | | |
|---|---|---|---|
| 7,700,517 B2* | 4/2010 | Li et al. | 502/324 |
| 2001/0014304 A1* | 8/2001 | Satokawa et al. | 423/244.11 |
| 2002/0009404 A1* | 1/2002 | Tsybulevskiy et al. | 423/244.04 |
| 2004/0057890 A1 | 3/2004 | Satokawa et al. | |
| 2004/0200758 A1* | 10/2004 | Yang et al. | 208/208 R |
| 2005/0173297 A1* | 8/2005 | Toida | 208/14 |
| 2006/0162557 A1* | 7/2006 | Kim et al. | 95/135 |
| 2007/0131589 A1* | 6/2007 | Weston et al. | 208/213 |

FOREIGN PATENT DOCUMENTS

| | | |
|---|---|---|
| CN | 1508221 A | 6/2004 |
| CN | 1653164 A | 8/2005 |
| CN | 1732250 A | 2/2006 |
| JP | 6-306377 | 11/1994 |
| JP | 2001-205004 | 7/2001 |
| JP | 2001-305123 | 10/2001 |
| JP | 2002-66313 | 3/2002 |
| JP | 2003-20489 | 1/2003 |
| JP | 2004-99826 | 4/2004 |
| JP | 2004-228016 | 8/2004 |
| JP | 2006-205163 | 8/2006 |
| WO | WO 2005/013392 | 2/2005 |

OTHER PUBLICATIONS

Satokawa, Shigeo, et al. "Removal of sulfur compounds from natural gas by adsorption on Ag exchanged zeolites for PEFC", Science and Technology in Catalysis (2002).*

Machine translation of CN 1482210 (2002).*

Office Action issued in Chinese Patent Application No. 2007100081403 on Sep. 19, 2008.

Japanese Office Action dated Mar. 16, 2010, issued in corresponding Japanese Application No. 2007-036633.

SIPO Registration Determination Certificate dated May 19, 2010, for corresponding Chinese Patent application 2007100081740.3, noting listed references in this IDS, as well as CN 1482210 and Cn 1508221, previously filed in an IDS dated Dec. 19, 2008.

* cited by examiner

DESULFURIZER FOR FUEL GAS FOR FUEL CELL AND DESULFURIZATION METHOD USING THE SAME

CROSS-REFERENCE TO RELATED APPLICATIONS

This application claims the benefit of Korean Patent Application No. 2006-15943, filed on Feb. 18, 2006, in the Korean Intellectual Property Office, the disclosure of which is incorporated herein in its entirety by reference.

BACKGROUND OF THE INVENTION

1. Field of the Invention

Aspects of the present invention relate to a desulfurizer for a fuel gas for a fuel cell and a desulfurization method using the same. More particularly, aspects of the present invention relate to a desulfurizer using absorbers that have selective absorption capacity for thiophene-based compounds and mercaptan-based compounds, and that includes multiple stages to perform a more efficient and economical desulfurizing of a fuel gas that contains various sulfur compounds, and a desulfurization method using the same.

2. Description of the Related Art

Fuel cells are electricity generation systems that directly convert the chemical energy of oxygen and the hydrogen contained in hydrocarbons such as methanol, ethanol, and natural gas to electrical energy.

Fuel cell systems consist of a fuel cell stack, a fuel processor (FP), a fuel tank, and a fuel pump. The fuel cell stack is the main body of the fuel cell, and comprises a plurality (several to several tens) of unit cells, each including a membrane electrode assembly (MEA) and a separator (or bipolar plate). The fuel pump supplies fuel from the fuel tank to the fuel processor. The fuel processor produces hydrogen by reforming and purifying the fuel and supplies the hydrogen to the fuel cell stack. The fuel cell stack receives the hydrogen and generates electrical energy by the electrochemical reaction of the hydrogen with oxygen.

Components of the fuel processor such as a reformer and a water-gas shift reactor, reform fuel gas for the fuel cell using a reforming catalyst and a shift catalyst and remove carbon monoxide. These catalysts, as well as the anode catalyst of the membrane electrode assembly, can be easily poisoned by the sulfur compounds.

FIG. 1 is a schematic graph illustrating the electrode voltage of a fuel cell against concentration of $H_2S$, which is a sulfur compound. Referring to FIG. 1, poisoning of the electrode due to the sulfur compounds dramatically decreases the voltage of a unit cell as the density of the sulfur compound increases (operating condition: anode=0.4 mg/cm$^2$ PtRu; cathode=0.4 mg/cm$^2$ Pt; Nafion 112; $T_{cell}$=65° C.; P=1.5 bar; anode not humidified; cathode humidified at 65° C.; exposure to $H_2S$ starts at 24 hrs). For this reason, sulfur compounds need to be removed before performing a reforming process on fuel gas.

FIG. 2 is a block diagram conceptually illustrating the constitution of a conventional fuel processor for a fuel cell. As shown in FIG. 2, the conventional fuel processor includes a desulfurizer to perform a desulfurization process.

City gas (that is, gas from a municipal utility) is a potential source of fuel gas for a fuel cell. However, city gas typically contains about 10 ppm of sulfur compounds, which are deliberately added to the gas to function as odorants. The sulfur compounds added to city gas typically include a mercaptan-based compound such as tertiarybutylmercaptan (TBM) and an alkyl thiophene-based compound such as tetrahydrothiophene (THT), which are typically added in the ratio of 3:7. Accordingly, in order to use city gas in a fuel cell, the sulfur compounds need to be removed to obtain a concentration of 10 ppb or less.

Methods of removing sulfur compounds can employ a hydrodesulfurization (HDS) process or an adsorbent. Although the hydrodesulfurization process is reliable, it requires high temperatures of 300° C. to 400° C., is complicated to operate and thus is more suited to large-scale plants rather than small-scale devices. Accordingly, in order to remove sulfur compounds such as TBM, THT, etc., from the fuel gas used in a small-scale device, a method employing an absorbent, such as an absorbent made of activated carbon, metal oxide, zeolite, or the like through which a fuel gas passes, is more suitable. However, absorbents have the disadvantage of requiring replacement or regeneration when they become saturated with sulfur compounds. The amount of absorbent required and the cycle life of the absorbent are largely influenced by the absorptivity of the absorbent. Thus, an absorbent that has a high absorptivity is preferred.

Various absorbents have been suggested to remove sulfur in city gas. However, the suggestions have focused on absorbents that absorb a specific sulfur component. Adsorbents that selectively absorb each component of fuel gas containing two or more kinds of sulfur compounds is not yet known. For example, Japanese Patent Laid-Open Publication No. hei 1994-306377 discloses a zeolite for removing mercaptan from city gas, which is ion-exchanged with polyvalent metal ions. However, this zeolite is unfortunately applicable only to mercaptans.

A zeolite containing silver (Ag) is known to be effective in removing mercaptan-based, thiophene-based, and sulfide-based compounds. However, a zeolite containing silver is very expensive and its absorption selectivity for each sulfur component in a fuel gas containing various sulfur compounds is not known.

The kind, density, and component ratios of sulfur compounds included in a fuel such as city gas may differ according to the country, region, season, and time. Thus, when a single absorber is used in a desulfurization process, the performance and durability of the absorber with regard to each sulfur compound that might be contained in the fuel cannot be predicted. Therefore, a sulfur component may escape absorption and flow into a fuel cell stack due to an inaccurate prediction of the sulfur compounds that will be contained in a fuel and an inaccurate selection of the absorber.

SUMMARY OF THE INVENTION

Aspects of the present invention provide a desulfurizer including a two-step absorption tank that sequentially includes a first absorber having selective absorption capacity for thiophene-based compounds and a second absorber that absorbs mercaptan-based compounds. The desulfurizer performs a more efficient, economical, and stable method of desulfurizing fuel gases used as fuel for fuel cells and containing various sulfur compounds, especially fuel gases containing thiophene-based compounds and mercaptan-based compounds in comparison to desulfurizers using a single absorber. Aspects of the present invention further include a desulfurization method using the desulfurizer.

According to an aspect of the present invention, there is provided a desulfurizer for fuel gas for a fuel cell containing at least one sulfur compound, including: a first absorption tank including a first absorber having selective absorption capacity for a thiophene-based compound, and a second absorption tank including a second absorber having selective absorption capacity for a mercaptan-based compound.

According to another aspect of the present invention, there is provided a fuel processor for a fuel cell including a desulfurizer, a reformer and at least one carbon monoxide removal apparatus, wherein the desulfurizer includes a first absorption tank comprising an absorber having a selective absorption capacity for a thiophene-based compound; and a second absorption tank comprising an absorber having a selective absorption capacity for a mercaptan-based compound.

According to another aspect of the present invention, there is provided a fuel cell system comprising a fuel processor and a fuel cell stack, wherein the fuel processor comprises a desulfurizer that comprises: a first absorption tank comprising an absorber having a selective absorption capacity for a thiophene-based compound; and a second absorption tank comprising an absorber having a selective absorption capacity for a mercaptan-based compound According to another aspect of the present invention, there is provided a method of desulfurizing a fuel gas for a fuel cell containing a sulfur compound, the method including: first removing thiophenes using a first absorber having selective absorption capacity for thiophene-based compounds; and then removing mercaptans remaining in the fuel gas using a second absorber having absorption capacity for a mercaptan-based compound.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
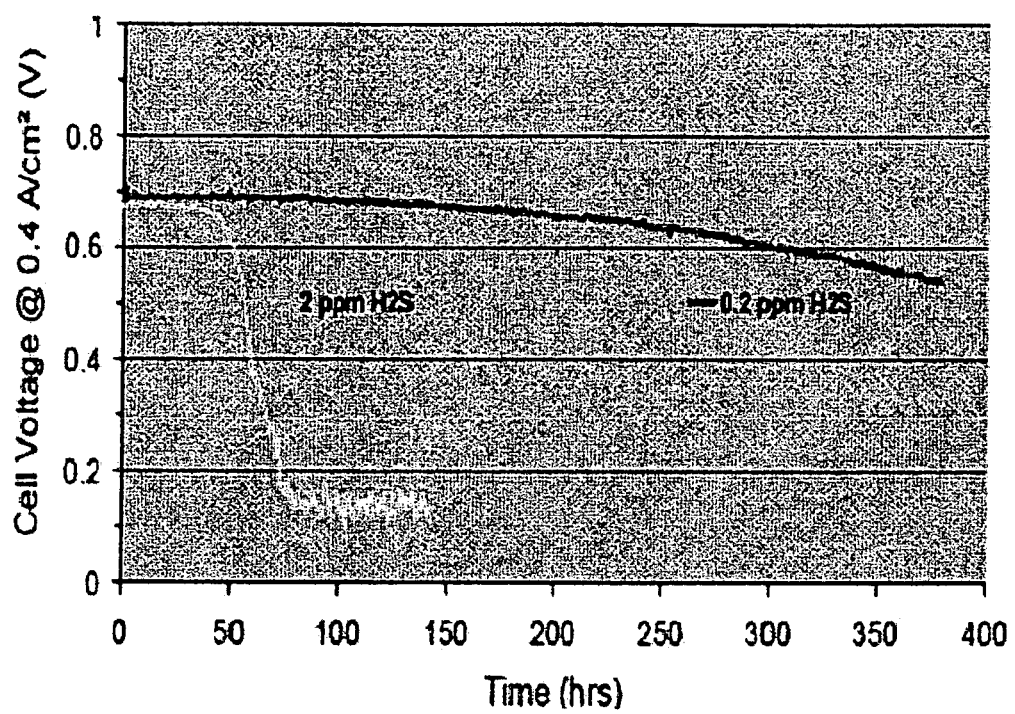
FIG. 1 is a schematic graph illustrating an electrode voltage of a conventional fuel cell against concentration of $H_2S$.
Figure 2:
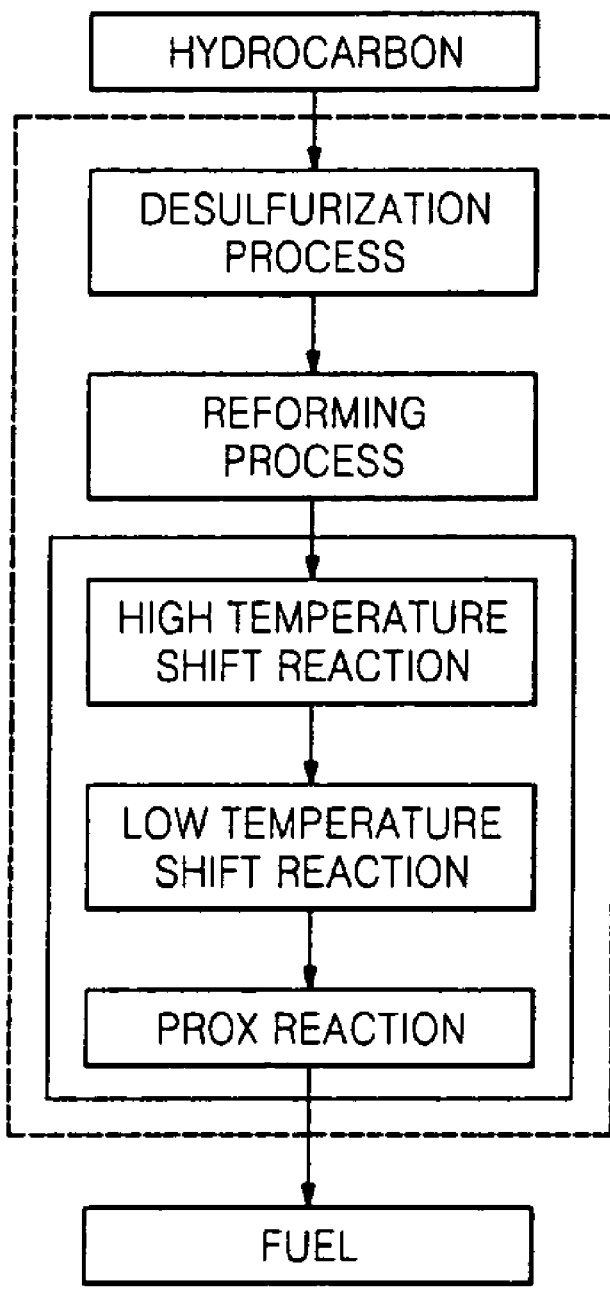
FIG. 2 is a block diagram conceptually illustrating the constitution of a conventional fuel processor for a fuel cell.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

City gas, as described above, typically contains sulfur compounds, such as tertiarybutylmercaptan (TBM) and/or tetrahydrothiophene (THT). As discussed above, the sulfur compounds that may be added to city gas are not limited to these specific compounds and in fact, various kinds of thiophene-based compounds and mercaptan-based compounds can be added. Thus, to prevent performance deterioration of a fuel cell, sulfur compounds of all kinds should be removed. An embodiment of the present invention provides a desulfurizer that provides stable, efficient, and economical desulfurization by including a two-step absorption tank that sequentially includes two types of absorbers, each having a selective absorption capacity for a different type of sulfur compound.

Figure 3:
FIG. 3 is a schematic drawing of a desulfurizer according to an embodiment of the present invention.

FIG. 3 is a schematic drawing of a desulfurizer according to an embodiment of the present invention. Referring to FIG. 3, the desulfurizer includes: a first absorption tank in an upper section of the desulfurizer, that is, near the inlet for the fuel gas that is to be desulfurized, to selectively remove a thiophene-based compound; and a second absorption tank in a lower section of the desulfurizer, that is, near an outlet for desulfurized fuel gas, to selectively remove a mercaptan-based compound. It is to be understood that other configurations besides the vertical arrangement shown in FIG. 3 are possible. Generally, a desulfurizer according to aspects of the present invention may include a first absorption tank in a first section and a second desulfurizer in a second section downstream from the first section.

The first absorption tank may include an Na—Y zeolite as an absorber and the second absorption tank may include an Ag—Y zeolite as an absorber.

Figure 4:
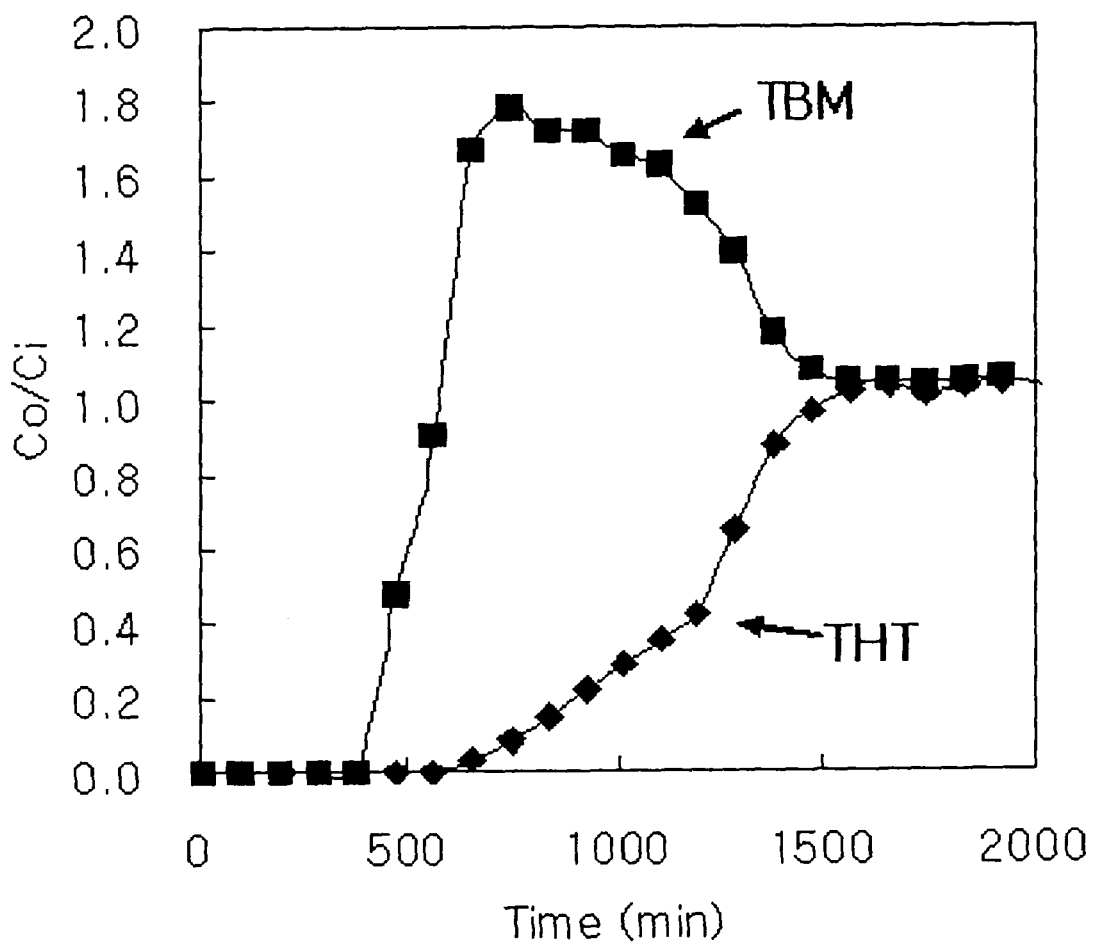
FIG. 4 is a graph showing the absorptivity and absorption selectivity of Na—Y against fuel gas containing tetrahydrothiophene (THT) and tertiarybutylmercaptan (TBM)
Figure 5:
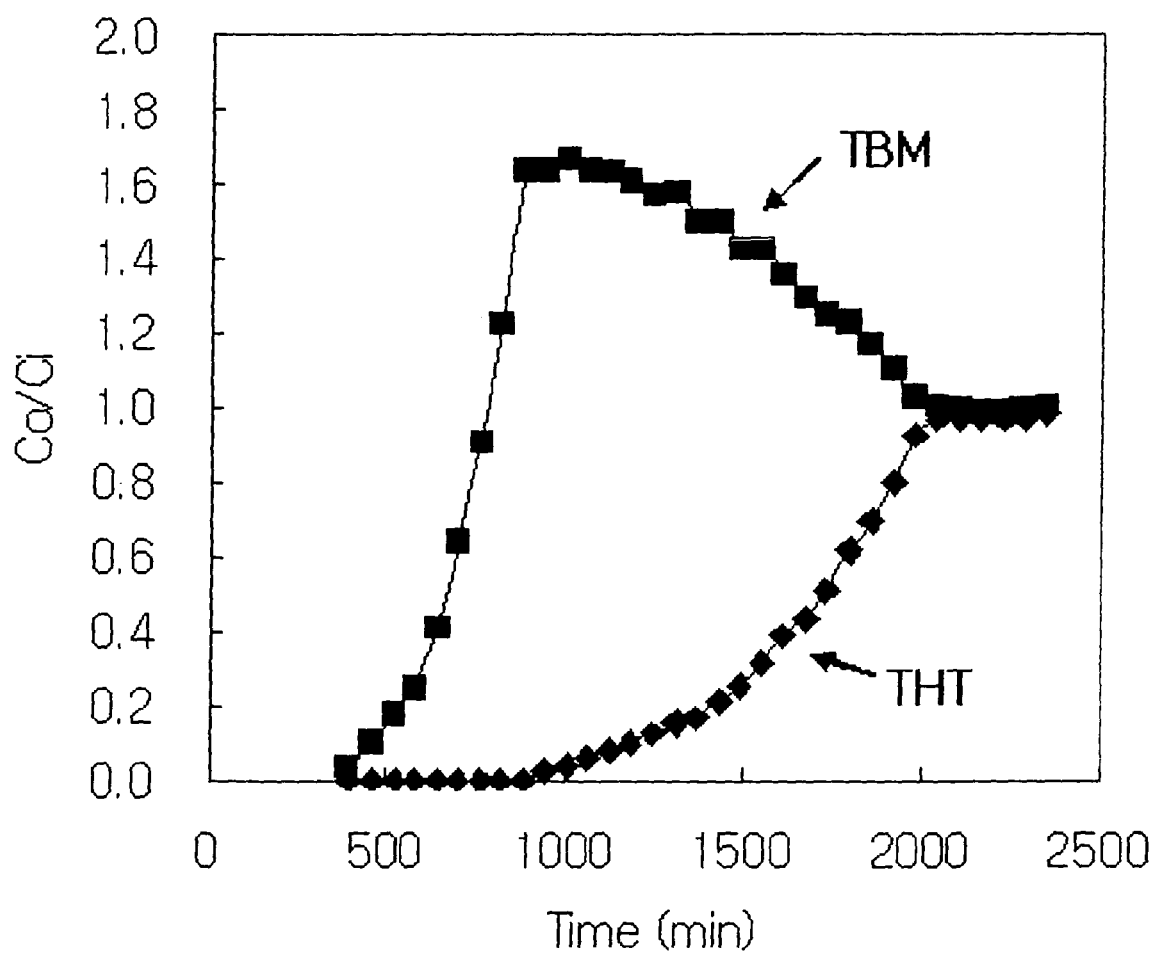
FIG. 5 is a graph showing the absorptivity and absorption selectivity of Ag—Y against fuel gas containing THT and TBM.
Figure 6:
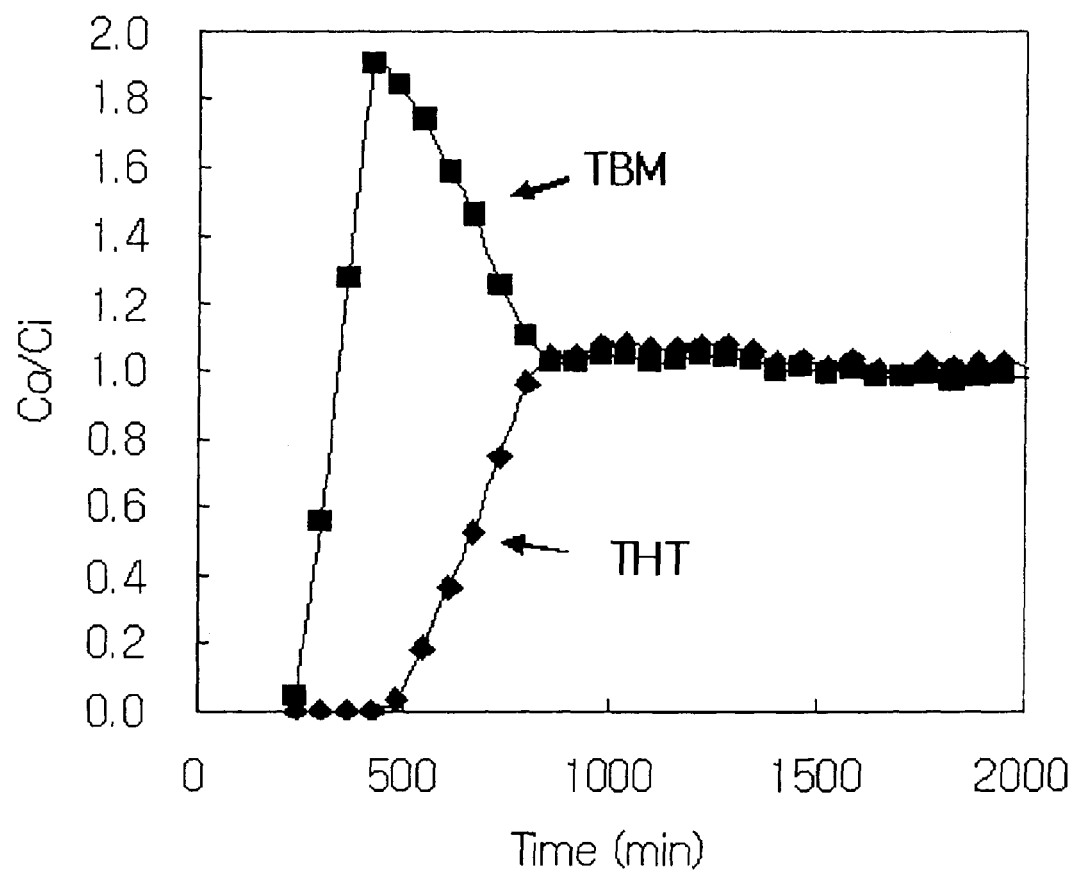
FIG. 6 is a graph showing the absorption performance of ETAS-10, which has different structure and different chemical properties from a Y-zeolite, against a fuel gas containing THT and TBM.

Reasons for first removing thiophenes and then removing mercaptans, by including two different kinds of zeolite in the desulfurizer, will now be described. FIG. 4 is a graph showing the absorptivity and absorption selectivity of Na—Y against fuel gas containing THT (a thiophene compound) and TBM (a mercaptan compound) under $10,000\ h^{-1}$ GHSV (THT: 100 ppm, TBM: 100 ppm, $CH_4$ balance). (GHSV=gas hourly space velocity.) Also, FIG. 5 is a graph showing absorptivity and absorption selectivity of Ag—Y against fuel gas containing THT and TBM under $10,000\ h^{-1}$ GHSV. Referring to FIG. 4, in the initial absorption, both TBM and THT are absorbed simultaneously. However, as THT is absorbed, most of the TBM is desorbed. As a result, when the absorption is in equilibrium, the Na—Y zeolite only has absorption selectivity for THT. Referring to FIG. 5, the Ag—Y zeolite, which is well known as a desulfurization absorber having superior performance, has the same result. FIG. 6 is a graph showing absorption performance of ETAS-10, which has different structure and chemical properties from a Y-zeolite, against THT and TBM. Similar to the Na—Y and Ag—Y zeolites, the result shows that in the initial absorption, both TBM and THT are absorbed simultaneously, but as THT is absorbed, most of the TBM is desorbed.

The above results show that there is an absorption intensity difference between THT and TBM when these gases are absorbed to the absorption point of the absorber. In other words, THT is strongly absorbed to the absorption point of the absorber, whereas TBM is relatively weakly absorbed to the absorption point. Accordingly, as THT is absorbed, THT pushes absorbed TBM out, thus desorbing TBM.

Consequently, the mercaptan-based sulfur compound has a weaker absorption capacity than the thiophene-based sulfur compound. Therefore, when the mercaptan-based sulfur compound and the thiophene-based sulfur compound exist together, the mercaptan-based sulfur compound cannot stably absorb to the absorber. Thus, to remove the mercaptan-based sulfur compound stably and effectively, the thiophenes should be removed first.

Figure 7:
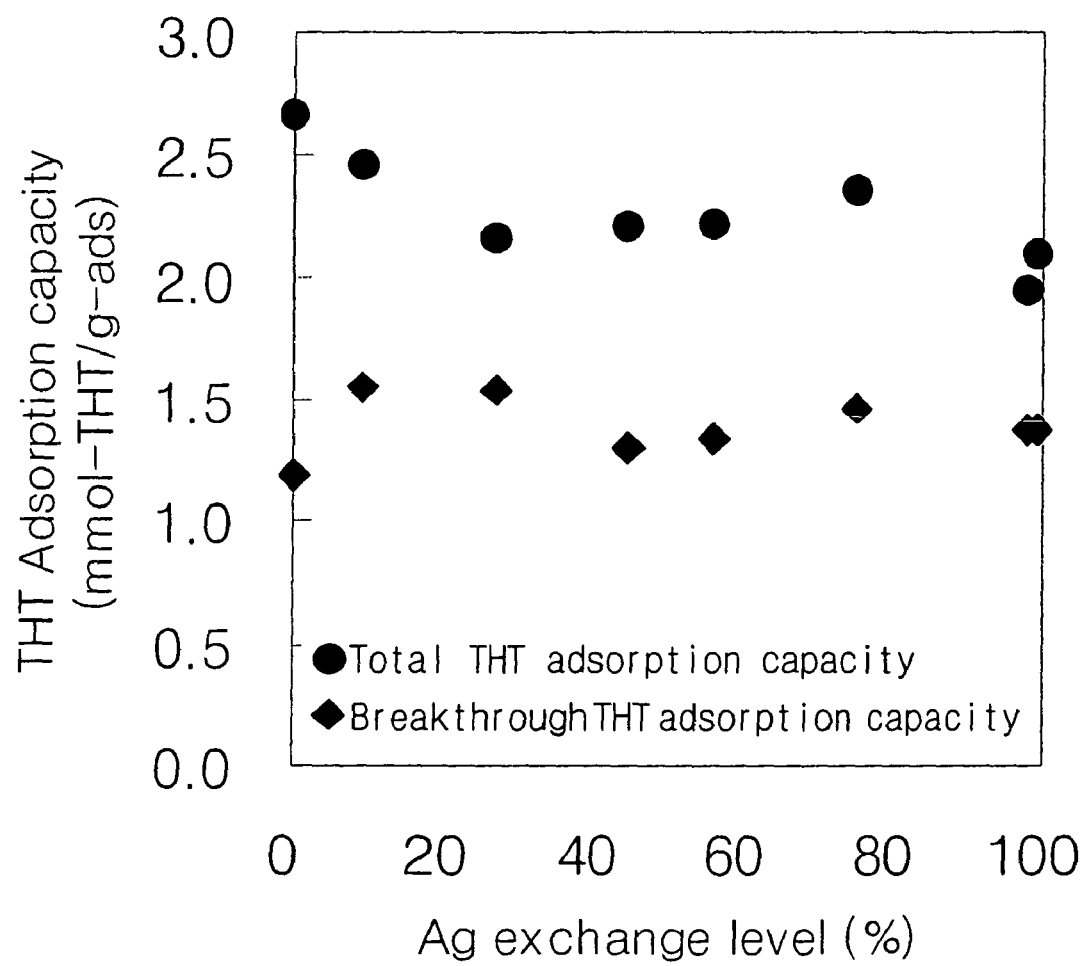
FIG. 7 is a graph of the amount of absorbed THT from a fuel gas containing only THT with respect to the Ag ion-exchange level of an Ag ion-exchanged Na—Y zeolite.
Figure 8:
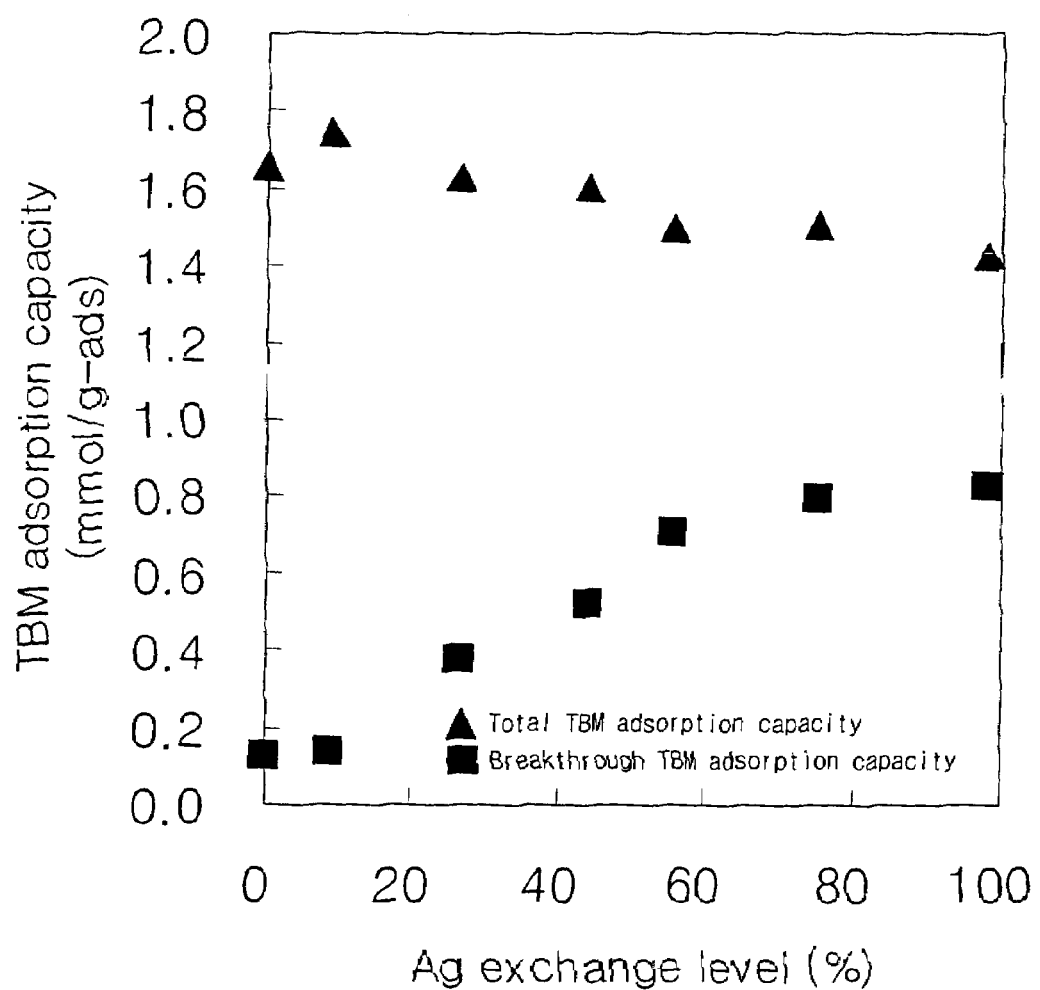
FIG. 8 is a graph of an amount of absorbed TBM from a fuel gas containing only TBM with respect to the Ag ion-exchange level of an Ag ion-exchanged Na—Y zeolite.

FIG. 7 is a graph of an amount of absorbed THT (a thiophene-based compound) from a fuel gas containing only THT (THT: 100 ppm, $CH_4$ balance) with respect to the Ag ion-exchange level of an Ag ion-exchanged Na—Y zeolite. FIG. 8 is a graph of an amount of absorbed TBM (a mercaptan-based compound) from a fuel gas containing only TBM (TBM: 100 ppm, $CH_4$ balance) with respect to the Ag ion-exchange level of an Ag ion-exchanged Na—Y zeolite. Referring to FIG. 7, the breakthrough THT absorption capacity, which is defined as the amount of THT absorbed on the absorbent before the THT concentration in the effluent reach 50 ppb, is uniform regardless of the Ag ion-exchange level. However, referring to FIG. 8, the breakthrough TBM capacity, which is defined as the amount of TBM absorbed on the absorbent before TBM concentration in the effluent reach 50 ppb, continuously increases as the Ag ion-exchange level increases, until the Ag ion-exchange level reaches a certain level, that is, about 50% or more, at which point the amount of absorbed TBM does not increase anymore. THT, on the other hand, has a strong absorption capacity, and so Ag does not affect the absorption. However, when THT is not present, the absorption amount of TBM, as the mercaptan-based compound, increases to a certain level as the level of Ag in the Ag ion-exchanged Na—Y zeolite increases.

Accordingly, to efficiently and stably remove all sulfur compounds in the fuel gas that has both thiophene-based and mercaptan-based sulfur compounds, the thiophene-based sulfur compound should be selectively removed first, before the mercaptan-based sulfur compound are removed.

Hence, the desulfurizer according to an embodiment of the present invention removes the thiophene-based compound first using an Na—Y zeolite, which is relatively cheap, and then removes the mercaptan-based compound using an Ag—Y zeolite, which is relatively expensive.

Moreover, the desulfurizer according to an embodiment of the present invention is effective considering the amount ratio of THT and the TBM (7:3) contained in typical city gas. The thiophene-based compound, which is present in relatively large amount, is removed first using a cheap absorber, and then the relatively small amount of the mercaptan-based compound remaining can be removed using an expensive absorber.

The Si/Al ratio in the Na—Y zeolite and the Ag—Y zeolite may be in the range of 2 to 5. When the ratio is less than 2, the thermal stabilities while preparing the Na—Y zeolite and the Ag—Y zeolite are low, so that the structures may deteriorate. When the ratio is more than 5, the amount of Al in the Na—Y and Ag—Y zeolites is small, and thus the number of Na cations, which should electrically balance the Al anions, is small. Accordingly, the absorption performance of the Na—Y and Ag—Y zeolites deteriorates.

The Na/Al ratio of the balanced cation Na of the Na—Y zeolite may be in the range of 0.1 to 1.0. When the ratio is less than 0.1, the absorption effect by Na is low. When the ratio is greater than 1.0, the structural stability of the Na—Y zeolite deteriorates.

The Ag ion-exchange ratio of the Ag—Y zeolite, that is, the ratio of Ag/Al of the Ag—Y zeolite may be in the range of 0.2 to 0.7. When the ratio is less than 0.2, effective absorption of the mercaptan-based compound is difficult. When the ratio is greater than 0.7, even though the Ag ion-exchange ratio increases, the absorption amount of mercaptan-based compound does not increase, and thus, because of the cost of Ag, the zeolite becomes uneconomical. To keep the ratio of Ag/Al in the above range, the Ag—Y zeolites may be ion-exchanged at 25 to 30° C. for 30 minutes to 2 hours in an Ag precursor solution.

The Na—Y and Ag—Y zeolites may be pretreated at 350 to 450° C. for 3 to 5 hours in air. This pretreatment is performed to remove moisture in the Na—Y and Ag—Y zeolites and to stabilize the structures thereof.

Sulfur compounds that can be removed using the desulfurizer of the current embodiment are mainly thiophene-based compounds and mercaptan-based compounds.

Examples of thiophene-based compounds that can be removed by the desulfurizer of the current embodiment include thiophene, thiophenol, alkylthiophenes such as 2-methylthiophene, 3-methylthiophene, ethylthiophene, dimethylthiophene, trimethylthiophene, tetrahydrothiophene (THT), or the like, and benzothiophenes such as benzothiophene, dibenzothiophene, methylbenzothiophene, dimethylbenzothiophene, or the like, but the thiophene-based compound is not limited thereto. For example, the desulfurizer of the current embodiment may remove tetrahydrothiophene (THT).

Examples of the mercaptan-based compounds that can be removed by the desulfurizer of the current embodiment include 1-ethanethiol, 1-propanethiol, 2-propanethiol, 2-butanethiol, t-butyl mercaptan (TBM), 2-methyl-2-propanethiol, pentanethiol, hexanethiol, heptanethiol, octanethiol, nonanethiol, thiophenol, etc. but the mercaptan-based compound is not limited thereto. For example, the desulfurizer of the current embodiment may remove t-butyl mercaptan (TBM).

The desulfurizer according to the current embodiment of the present invention may further include a guard bed in front of the first and second absorption tanks to remove moisture and impurities in the fuel gas. The guard bed may include at least one material selected from the group consisting of a zeolite, a silica gel, and an activated carbon to remove moisture and impurities.

Moreover, the desulfurizer may further include an indicator to indicate the concentration of a sulfur compound in the desulfurized fuel gas. The indicator may be a reaction tank filled with a material that develops a color by reacting with any mercaptan-based compound that may be present in the desulfurized fuel gas.

Another embodiment of the present invention provides a method of desulfurizing a fuel gas for a fuel cell containing a sulfur compound, the method including: first removing thiophenes using an absorber having selective absorption capacity for thiophene-based compounds; and then removing the mercaptans remaining in the fuel gas using an absorber having absorption capacity for mercaptan-based compounds.

The removing of the thiophenes and the removing of the mercaptans may be performed in the above described first and second absorption tanks, respectively. The materials and the amounts thereof filled in each absorption tank are the same as described above, and the details of the thiophene-based and mercaptan-based compounds removed are also the same as described above. In addition, the desulfurization method may further include removing moisture and impurities in the fuel gas using a guard bed and detecting the concentration of the sulfur compound using an indicator.

Details of the desulfurization method include contacting the fuel gas containing the sulfur compound with the material in each absorption tank by passing the fuel gas through the first and the second absorption tanks. For example, the fuel gas may pass through a layer of the absorber fixed inside each absorption tank, but is not limited thereto. Another example of the contacting of the fuel gas may be: preparing the absorber in powder or pellet form; charging a cylinder with the absorber in a stationary phase; and passing the fuel gas containing the sulfur compound through the cylinder.

The passing of the fuel gas containing the sulfur compound through the first and second absorption tanks may be performed at a suitable temperature such as, for example, 0 to 50° C. It is uneconomical to maintain a low temperature of less than 0° C. At a temperature higher than 50° C., the absorption performance of the absorber deteriorates, and unnecessary costs are incurred to maintain the high temperature.

The passing of the fuel gas through the first and second absorption tanks may be performed under a suitable pressure such as, for example, 0.5 to 2.5 atm. It is uneconomical to maintain a pressure of less than 0.5 atm. or greater than 2.5 atm.

The desulfurizer described above can be employed in a general fuel cell system, that is, a fuel cell system that includes a fuel processor and a fuel cell stack. The fuel cell stack may be formed by stacking unit fuel cells, each unit fuel cell including: an anode including a catalyst layer and a diffusion layer; a cathode including a catalyst layer and a diffusion layer; and an electrolyte disposed between the cathode and the anode. Also, the fuel processor may include, in addition to the desulfurizer, a carbon monoxide removal apparatus including a reformer, a high temperature shift reactor, a low temperature shift reactor, and a PROX reactor.

The unit fuel cell, for example, may be any type of fuel cell such as, for example, a phosphoric acid fuel cell (PAFC), a proton exchange membrane fuel cell (PEMFC), a molten carbonate fuel cell (MCFC), a and solid oxide fuel cell (SOFC). The structure and preparation method of the unit fuel cell are not specifically limited, and since details thereof are disclosed elsewhere, descriptions thereof will be omitted.

Aspects of the present invention will be described in greater detail with reference to the following examples. The following examples are for illustrative purposes only and are not intended to limit the scope of the invention.

EXAMPLE

A two-step desulfurizer according to an embodiment of the present invention was prepared by charging a first absorption tank on an upper section of the two-step desulfurizer with 0.15 g of an Na—Y zeolite (ratio of Si/Al: 2.8, ratio of Na/Al: 1.0) and a second absorption tank on a lower section of the two-step desulfurizer with 0.15 g of an Ag—Y zeolite (ratio of Si/Al: 2.8, ratio of Ag/Al: 0.7).

Figure 9:
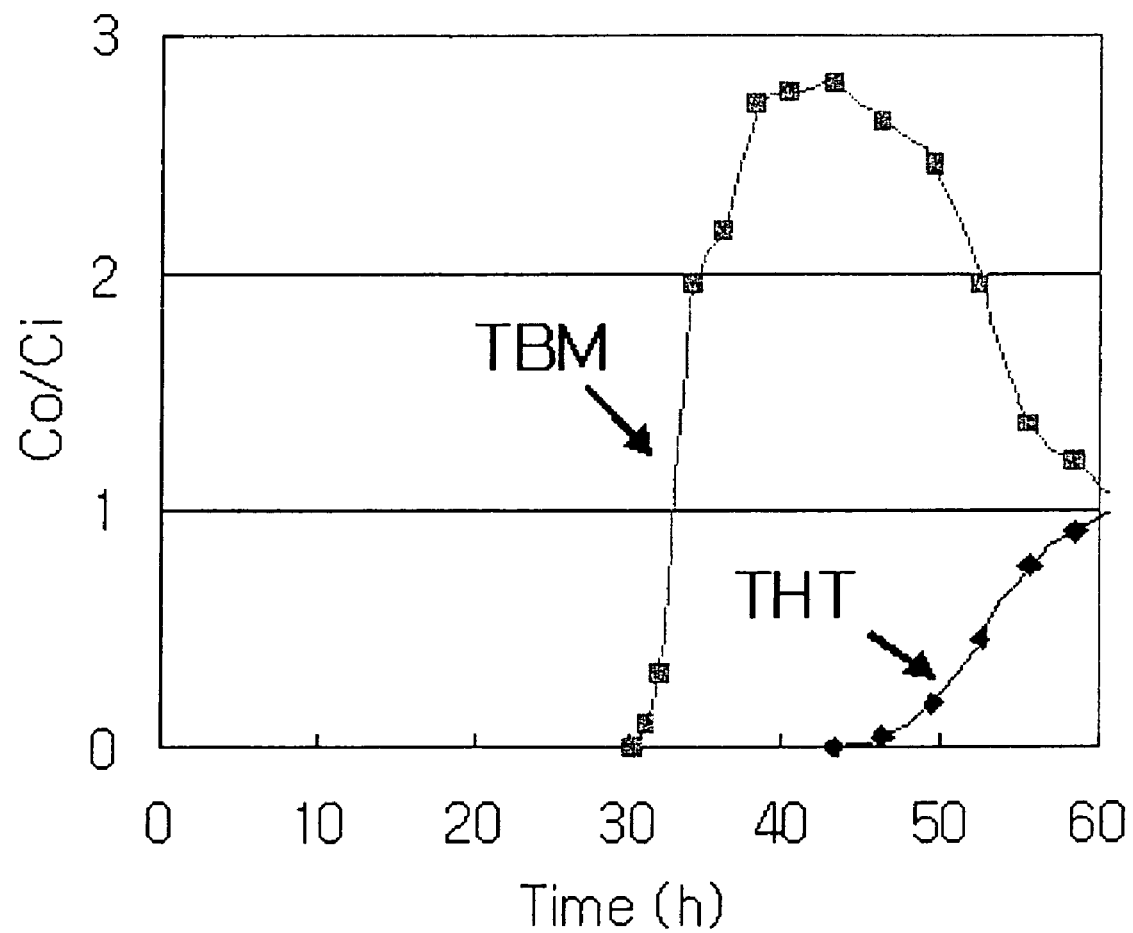
FIG. 9 is a graph illustrating the desulfurization absorption performance of a two-step desulfurizer according to an embodiment of the present invention, wherein a first absorption tank on an upper section is charged with Na—Y zeolite and a second absorption tank on a lower section is charged with Ag—Y zeolite, using a fuel gas containing THT and TBM.

The Na—Y zeolite was pretreated at 400° C. for 4 hours in air. The Ag—Y zeolite was prepared by pretreating an Na—Y at 400° C. for 4 hours in air and then ion-exchanging the pretreated zeolite by impregnating the pretreated zeolite in an Ag precursor solution for 1 hour at 27° C. Methane gas containing 70 ppm THT and 30 ppm TBM was passed through the two-step desulfurizer, formed of the first absorption tank and the second absorption tank, at 55 cm$^3$/min at room temperature. Concentrations of sulfur in the effluent from the desulfurizer were measured according to time, and the results are shown in FIG. 9. TBM, which represents unabsorbed sulfur, was detected in the effluent from the desulfurizer 30 hours after the experiment began.

Comparative Example 1

Figure 10:
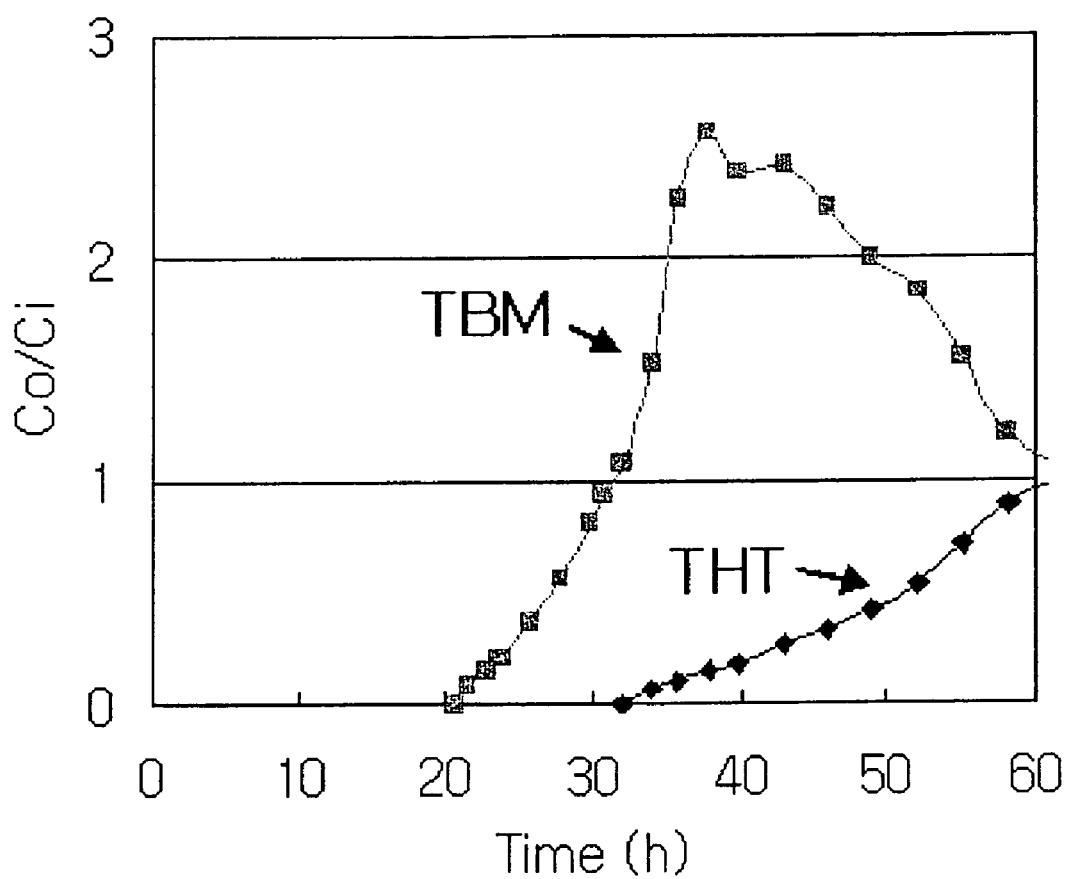
FIG. 10 is a graph illustrating the desulfurization absorption performance of a conventional desulfurizer charged with only Na—Y, using a fuel gas containing THT and TBM.

A conventional one-step desulfurizer including a single absorption tank charged with 0.3 g of an Na—Y zeolite was prepared. Methane gas containing 70 ppm THT and 30 ppm TBM was passed through the conventional one-step desulfurizer at 55 cm$^3$/min at room temperature. Concentrations of sulfur in the effluent from the desulfurizer were measured according to time, and the result is shown in FIG. 10. TBM, which represents unabsorbed sulfur, was detected in the effluent from the desulfurizer 20 hours after the experiment began.

Comparative Example 2

Figure 11:
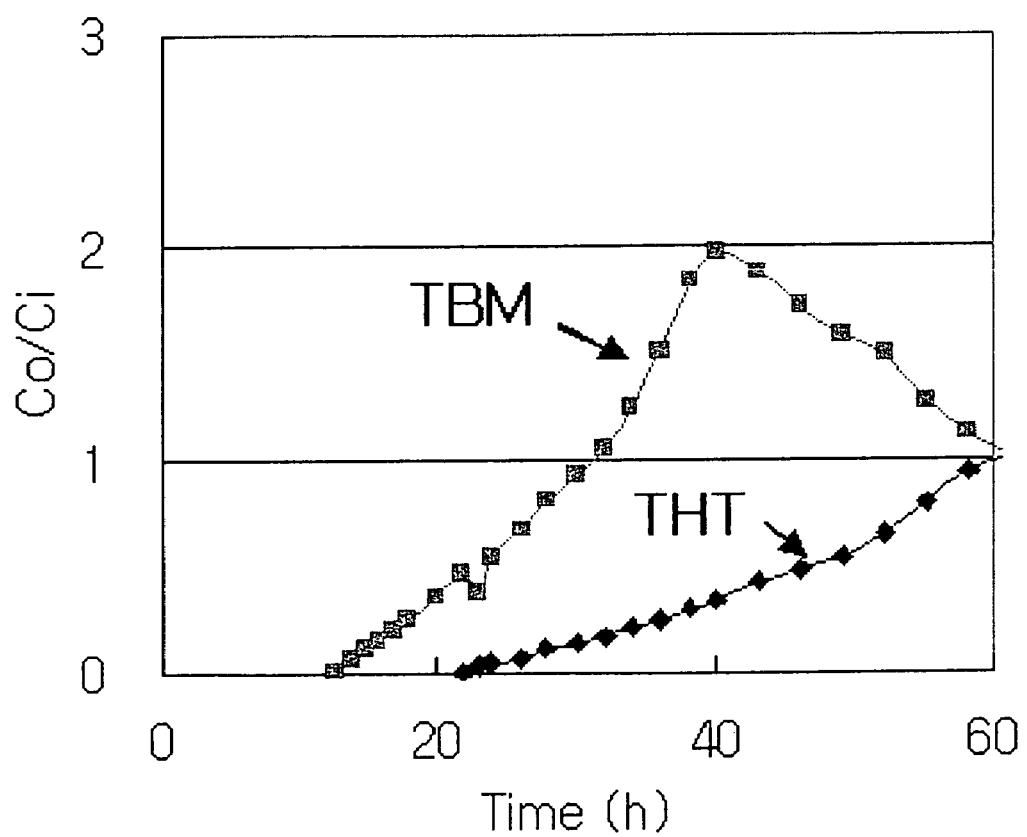
FIG. 11 is a graph illustrating the desulfurization absorption performance of a conventional desulfurizer charged with only Ag—Y, using a fuel gas containing THT and TBM.

A conventional one-step desulfurizer including a single absorption tank charged with an 0.3 g of an Ag—Y zeolite was prepared. Methane gas containing 70 ppm THT and 30 ppm TBM was passed through the conventional one-step desulfurizer at 55 cm$^3$/min at room temperature. Concentrations of sulfur in the effluent from the desulfurizer were measured according to time, and the result is shown in FIG. 11. TBM, which represents unabsorbed sulfur, was detected in the effluent from the desulfurizer 13 hours after the experiment began.

Comparative Example 3

A two-step desulfurizer was prepared by charging a first absorption tank on an upper section of the two-step desulfurizer with 0.15 g of an Ag—Y zeolite and a second absorption tank on a lower section of the two-step desulfurizer with 0.15 g of an Na—Y zeolite.

Figure 12:
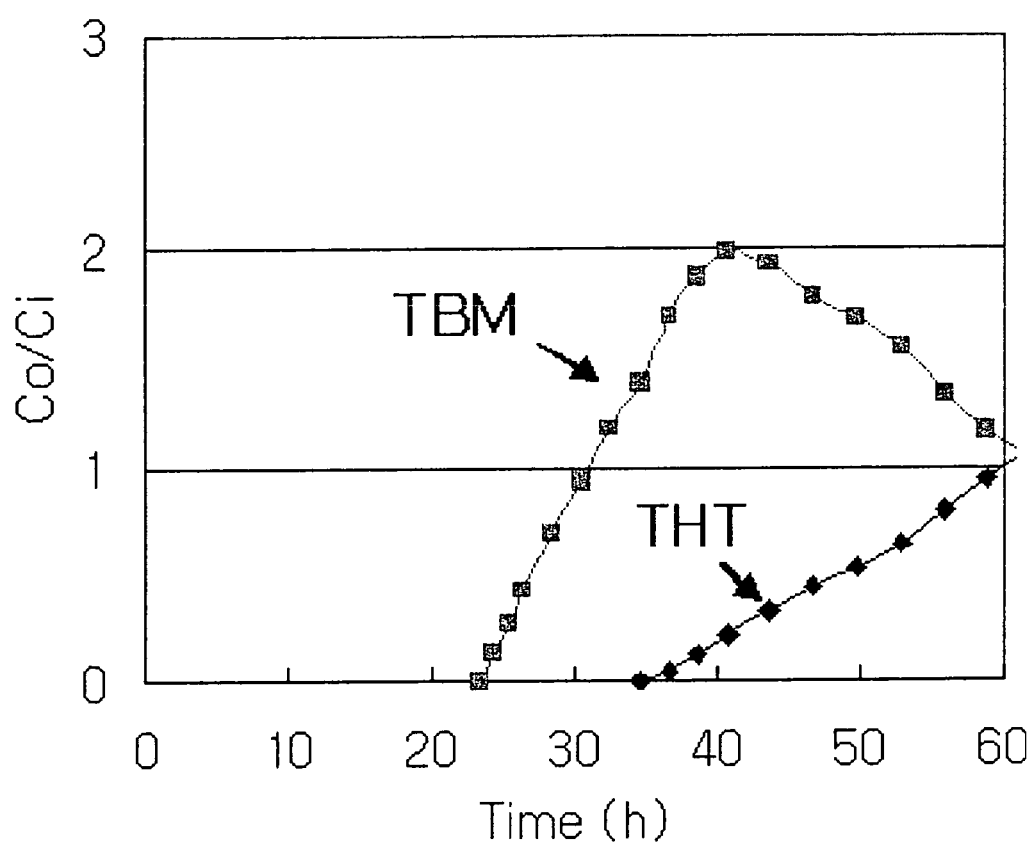
FIG. 12 is a graph illustrating the desulfurization absorption performance of a two-step desulfurizer, wherein a first absorption tank on an upper section is charged with Ag—Y zeolite and a second absorption tank on a lower section is charged with Na—Y zeolite, using a fuel gas containing THT and TBM.

The Ag—Y zeolite and the Na—Y zeolite were prepared using the same method described in the Example above. Methane gas containing 70 ppm THT and 30 ppm TBM was passed through the two-step desulfurizer, formed of the first absorption tank and the second absorption tank, at 55 cm$^3$/min at room temperature. Concentrations of sulfur in the effluent from the desulfurizer were measured according to time, and the results are shown in FIG. 12. TBM, which represents unabsorbed sulfur, was detected in the effluent from the desulfurizer 23 hours after the experiment began.

The desulfurizer according to aspects of the present invention uses absorbers having selective absorption capacity for a thiophene-based compound and a mercaptan-based compound, in multiple stages to perform a more efficient and economical method of desulfurizing various sulfur compounds, especially thiophene-based compounds and mercaptan-based compounds included in fuel gas for a fuel cell, in comparison to a desulfurizer that uses a single absorber.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A desulfurizer for fuel gas for a fuel cell containing at least one sulfur compound, comprising:
   a first adsorption tank comprising an Na—Y zeolite adsorber having a selective adsorption capacity for thiophene-based compounds; and
   a second adsorption tank comprising an Ag—Y zeolite adsorber having an Ag/Al ratio in the range of 0.2 to 0.7 and having a selective adsorption capacity for mercaptan-based compounds.

2. The desulfurizer of claim 1, wherein the first adsorption tank is in a first section of the desulfurizer and the second adsorption tank is in a second section of the desulfurizer downstream from the first section.

3. The desulfurizer of claim 1, wherein the first adsorption tank is in an upper section of the desulfurizer and the second adsorption tank is in a lower section of the desulfurizer.

4. The desulfurizer of claim 1 wherein the Si/Al ratio of the Na—Y zeolite is in the range of 2 to 5.

5. The desulfurizer of claim 1 wherein the Si/Al ratio of the Ag—Y zeolite is in the range of 2 to 5.

6. The desulfurizer of claim 1, wherein a Na/Al ratio of the Na—Y zeolite is in the range of 0.1 to 1.0.

7. The desulfurizer of claim 1, wherein the Na—Y zeolite adsorber is prepared by pretreating a Na—Y zeolite at 350 to 450° C. for 3 to 5 hours in air.

8. The desulfurizer of claim 1, wherein the Ag—Y zeolite is formed by pretreating an Na—Y zeolite at 350 to 450° C. for 3 to 5 hours in air and then ion-exchanging the pretreated Na—Y zeolite in an Ag precursor solution at 25 to 30° C. for 30 min. to 2 hours.

9. The desulfurizer of claim 1, wherein the Na—Y zeolite adsorber has a selective adsorption capacity for at least one compound selected from the group consisting of thiophenol, alkylthiophene, and benzothiophene.

10. The desulfurizer of claim 9,
    wherein the alkylthiophene comprises at least one material selected from the group consisting of 2-methylthiophene, 3-methylthiophene, ethylthiophene, dimethylthiophene, trimethylthiophene, and tetrahydrothiophene (THT); and
    wherein the benzothiophene comprises at least one material selected from the group consisting of benzothiophene, dibenzothiophene, methylbenzothiophene, and dimethylbenzothiophene.

11. The desulfurizer of claim 1, wherein the Na—Y zeolite adsorber has a selective adsorption capacity for tetrahydrothiophene.

12. The desulfurizer of claim 1, wherein the Na—Y zeolite adsorber has a selective adsorption capacity for at least one compound selected from the group consisting of 1-ethanethiol, 1-propanethiol, 2-propanethiol, 2-butanethiol, t-butyl mercaptan (TBM), 2-methyl-2-propanethiol, pentanethiol, hexanethiol, heptanethiol, octanethiol, nonanethiol, and thiophenol.

13. The desulfurizer of claim 1, wherein the Na—Y zeolite adsorber has a selective adsorption capacity for tertiarybutylmercaptan.

14. The desulfurizer of claim 1, further comprising a guard bed in front of the first and/or second adsorption tanks to remove moisture and impurities in the fuel gas.

15. The desulfurizer of claim 14, wherein the guard bed comprises at least one material selected from the group consisting of a zeolite, a silica gel, and an activated carbon.

16. The desulfurizer of claim 1, further comprising an indicator after the second adsorption tank to indicate the concentration of a sulfur compound in the desulfurized fuel gas.

17. A fuel processor for a fuel cell comprising a desulfurizer, a reformer and at least one carbon monoxide removal apparatus, wherein the desulfurizer comprises:
    a first adsorption tank comprising an Na—Y zeolite adsorber having a selective adsorption capacity for a thiophene-based compound; and
    a second adsorption tank comprising an Ag—Y zeolite adsorber having an Ag/Al ratio in the range of 0.2 to 0.7 and having a selective adsorption capacity for a mercaptan-based compound.

18. A fuel cell system comprising a fuel processor and a fuel cell stack, wherein the fuel processor comprises a desulfurizer that comprises:
    a first adsorption tank comprising a Na—Y zeolite adsorber having a selective adsorption capacity for a thiophene-based compound; and
    a second adsorption tank comprising an Ag—Y zeolite adsorber having an Ag/Al ratio in the range of 0.2 to 0.7 and having a selective adsorption capacity for a mercaptan-based compound.

* * * * *